US012593021B2

(12) United States Patent
Sung et al.

(10) Patent No.: US 12,593,021 B2
(45) Date of Patent: Mar. 31, 2026

(54) ELECTRONIC APPARATUS AND METHOD FOR CONTROLLING THEREOF

(71) Applicant: Samsung Electronics Co., Ltd., Suwon-si (KR)

(72) Inventors: Geeyoung Sung, Suwon-si (KR); Changkun Lee, Suwon-si (KR); Jungkwuen An, Suwon-si (KR); Hongsuk Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/670,012

(22) Filed: May 21, 2024

(65) Prior Publication Data

US 2025/0008072 A1      Jan. 2, 2025

Related U.S. Application Data

(63) Continuation of application No. PCT/KR2024/095531, filed on Mar. 14, 2024.

(30) Foreign Application Priority Data

Jun. 28, 2023    (KR) ........................ 10-2023-0083753
Sep. 11, 2023    (KR) ........................ 10-2023-0120656

(51) Int. Cl.
*H04N 13/305*      (2018.01)
*G06T 7/507*      (2017.01)
(Continued)

(52) U.S. Cl.
CPC .......... *H04N 13/305* (2018.05); *G06T 7/507* (2017.01); *G06T 7/596* (2017.01); *G09G 3/36* (2013.01);
(Continued)

(58) Field of Classification Search
CPC .......... G06T 2207/10012; G06T 7/507; G06T 7/596; G09G 2354/00; G09G 3/003;
(Continued)

(56) References Cited

U.S. PATENT DOCUMENTS 6,023,277 A * 2/2000 Osaka ..................... G06F 3/147
                                                  348/E13.043
10,139,721 B1    11/2018 Choi
(Continued)

FOREIGN PATENT DOCUMENTS

JP          2022-115498 A      8/2022
KR     10-2009-0009588 A      1/2009
(Continued)

OTHER PUBLICATIONS

International Search Report dated Jun. 14, 2024, issued in International Application No. PCT/KR2024/095531.
(Continued)

*Primary Examiner* — Christopher S Kelley
*Assistant Examiner* — Ana Picon-Feliciano
(74) *Attorney, Agent, or Firm* — Jefferson IP Law, LLP

(57) ABSTRACT

An electronic apparatus and a method for controlling thereof are provided. The electronic apparatus includes a first display comprising a first display panel for displaying a multi-view image and a micro-lens array which is arranged on a front surface of the first display panel and is for adjusting directions of lights output through the first display panel, a second display comprising a second display panel which is arranged on the front surface of the first display and displays a two-dimensional image corresponding to the multi-view image and has a transmittance greater than or equal to a predetermined value, memory storing one or more computer
(Continued)

program, and one or more processors communicatively coupled to the first display, the second display, and the memory.

20 Claims, 20 Drawing Sheets

(51) Int. Cl.

| | |
|---|---|
| *G06T 7/593* | (2017.01) |
| *G09G 3/36* | (2006.01) |
| *H04N 13/15* | (2018.01) |
| *H04N 13/282* | (2018.01) |
| *H04N 13/351* | (2018.01) |
| *H04N 13/356* | (2018.01) |
| *H04N 13/398* | (2018.01) |

(52) U.S. Cl.
CPC .......... *H04N 13/15* (2018.05); *H04N 13/282* (2018.05); *H04N 13/351* (2018.05); *H04N 13/356* (2018.05); *H04N 13/398* (2018.05); *G06T 2207/10012* (2013.01); *G09G 2354/00* (2013.01)

(58) Field of Classification Search
CPC ........ G09G 3/36; H04N 13/15; H04N 13/282; H04N 13/305; H04N 13/351; H04N 13/356; H04N 13/398; H04N 13/156; H04N 13/395
USPC .......................................................... 348/43
See application file for complete search history.

(56) References Cited

U.S. PATENT DOCUMENTS

| | | | |
|---|---|---|---|
| 11,223,817 | B2 | 1/2022 | Kim |
| 11,428,952 | B2 | 8/2022 | Nussbaum |
| 2009/0033741 | A1* | 2/2009 | Oh ........................ H04N 13/361 |
| | | | 348/E13.001 |
| 2010/0289819 | A1 | 11/2010 | Singh et al. |
| 2011/0032252 | A1* | 2/2011 | Ohta ....................... H04N 13/10 |
| | | | 345/419 |
| 2013/0093862 | A1 | 4/2013 | Willemsen et al. |
| 2018/0165052 | A1* | 6/2018 | Kim ............................ G06F 3/14 |
| 2018/0341171 | A1* | 11/2018 | Choi ....................... G03B 21/56 |
| 2020/0154096 | A1* | 5/2020 | Kim ..................... H04N 13/349 |
| 2021/0012750 | A1* | 1/2021 | Kwon ....................... G09G 5/10 |
| 2022/0335701 | A1 | 10/2022 | Oh et al. |

FOREIGN PATENT DOCUMENTS

| | | |
|---|---|---|
| KR | 10-1684666 B1 | 12/2016 |
| KR | 10-1741227 B1 | 5/2017 |
| KR | 10-2025473 B1 | 11/2019 |
| KR | 10-2020-0054846 A | 5/2020 |
| KR | 10-2020-0077849 A | 7/2020 |
| KR | 10-2021-0049594 A | 5/2021 |
| WO | 2022/192054 A1 | 9/2022 |

OTHER PUBLICATIONS

Extended European Search Report dated Dec. 19, 2025; European Appln. No. 24832547.4-1207 / 4657850 PCT/KR2024095531.

\* cited by examiner 320-2

320-1

120        110

ELECTRONIC APPARATUS AND METHOD FOR CONTROLLING THEREOF

CROSS-REFERENCE TO RELATED APPLICATION(S)

This application is a continuation application, claiming priority under § 365(c), of an International application No. PCT/KR2024/095531, filed on Mar. 14, 2024, which is based on and claims the benefit of a Korean patent application number 10-2023-0083753, filed on Jun. 28, 2023, in the Korean Intellectual Property Office, and of a Korean patent application number 10-2023-0120656, filed on Sep. 11, 2023, in the Korean Intellectual Property Office, the disclosure of each of which is incorporated by reference herein in its entirety.

TECHNICAL FIELD

The disclosure relates to an electronic apparatus and a method for controlling thereof. More particularly, the disclosure relates to an electronic apparatus that can provide a three-dimensional (3D) image by using a plurality of displays, and a method for controlling thereof.

DESCRIPTION OF THE RELATED ART

Spurred by the development of electronic technologies, various types of electronic apparatuses are being developed and distributed. As performances of electronic apparatuses have become enhanced, kinds of contents provided at electronic apparatuses have also been increased to be various. More particularly, recently, electronic apparatuses that enable viewing of even three-dimensional image contents have been developed and distributed.

An electronic apparatus providing three-dimensional image contents not only is implemented as signage providing advertising images outdoors, but also be implemented as various types of display apparatuses, such as a 3D television (TV) used in general homes, various kinds of monitors, a mobile phone, a personal digital assistance (PDA), a personal computer (PC), a set-top PC, a tablet PC, an electronic photo frame, a kiosk, or the like.

More particularly, electronic apparatuses providing three-dimensional images can largely be classified into a glasses-free system wherein viewing is possible without glasses, and a glasses system wherein viewing should be performed by wearing glasses. A glasses system can provide a satisfactory stereoscopic sense, but there is inconvenience that a viewer must use glasses. Compared to this, a glasses-free system has an advantage that three-dimensional images can be viewed without glasses, and thus there have been continuous discussions on development of a glasses-free system.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Task

Aspects of the disclosure are to address at least the above-mentioned problems and/or disadvantages and to provide at least the advantages described below. Accordingly, an aspect of the disclosure is to provide an electronic apparatus that can provide a 3D image by using a plurality of displays, and a method for controlling thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a first display including a first display panel for displaying a multi-view image and a micro-lens array which is arranged on a front surface of the first display panel and is for adjusting directions of lights output through the first display panel, a second display including a second display panel which is arranged on the front surface of the first display and displays a two-dimensional image corresponding to the multi-view image and has a transmittance greater than or equal to a predetermined value, memory storing one or more computer programs, and one or more processors communicatively coupled to the first display, the second display, and the memory.

Based on the multi-view image being displayed through the first display panel and the two-dimensional image being displayed through the second display panel, an area corresponding to an object included in the two-dimensional image in the multi-view image is processed based on information on the object included in the two-dimensional image.

The processor, based on the second display panel being implemented as a self-luminous display panel, and the pixel resolution of the first display panel being smaller than the pixel resolution of the second display panel, generates the multi-view image by processing the area corresponding to the object in the multi-view image in a predetermined color based on color information of the object included in the two-dimensional image.

An area corresponding to an object included in the multi-view image is greater than the area wherein the object included in the two-dimensional image is displayed, and the processor generates the two-dimensional image by processing the remaining area excluding the area wherein the object is displayed in the area corresponding to the object in the two-dimensional image in a color corresponding to the multi-view image.

The electronic apparatus includes a sensor for detecting a light, and the processor processes the multi-view image to include a shadow of the object included in the two-dimensional image in the multi-view image based on location information and shape information of the object included in the two-dimensional image, and the strength and the direction of a light detected through the sensor.

The processor, based on the first display panel and the second display panel being implemented as liquid crystal display (LCD) panels, in the case of operating in a three-dimensional image display mode, controls the first display panel to display the multi-view image, and controls the second display panel to display the two-dimensional image, and in the case of operating in a two-dimensional image display mode, controls the first display panel to display a monochrome image in a predetermined color, and control the second display panel to display a two-dimensional image.

The processor, based on the second display panel being implemented as a self-luminous display panel, in the case of operating in a three-dimensional image display mode, controls the first display panel to display the multi-view image, and controls the second display panel to display the two-dimensional image, and in the case of operating in a two-dimensional image display mode, turns off the first display panel, and control the second display panel to display a two-dimensional image.

The electronic apparatus includes a polarization control unit arranged between the first display and the second display.

The micro-lens array includes a lenticular lens.

In accordance with another aspect of the disclosure, a method for controlling an electronic apparatus is provided. The electronic apparatus includes a first display including a first display panel for displaying a multi-view image and a micro-lens array which is arranged on a front surface of the first display panel and is for adjusting directions of lights output through the first display panel, a second display including a second display panel which is arranged on the front surface of the first display and displays a two-dimensional image corresponding to the multi-view image and has a transmittance greater than or equal to a predetermined value, and wherein the method includes acquiring a user instruction for operating in a three-dimensional image display mode, displaying a multi-view image by using the first display panel in response to the user instruction, and displaying a two-dimensional image by using the second display panel.

The method includes the steps of, based on the multi-view image being displayed through the first display panel and the two-dimensional image being displayed through the second display panel, processing an area corresponding to an object included in the two-dimensional image in the multi-view image based on information on the object included in the two-dimensional image.

In the processing step, based on the second display panel being implemented as a self-luminous display panel, and the pixel resolution of the first display panel being smaller than the pixel resolution of the second display panel, the area corresponding to the object in the multi-view image is processed in a predetermined color based on color information of the object included in the two-dimensional image.

An area corresponding to an object included in the multi-view image is greater than the area wherein the object included in the two-dimensional image is displayed, and in the processing step, the two-dimensional image is generated by processing the remaining area excluding the area wherein the object is displayed in the area corresponding to the object in the two-dimensional image in a color corresponding to the multi-view image.

The electronic apparatus includes a sensor for detecting a light, and in the processing step, the multi-view image is processed to include a shadow of the object included in the two-dimensional image in the multi-view image based on location information and shape information of the object included in the two-dimensional image, and the strength and the direction of a light detected through the sensor.

The method includes the steps of, based on the first display panel and the second display panel being implemented as LCD panels, acquiring a user instruction for operating in a two-dimensional image display mode, and based on operating in the two-dimensional image display mode, displaying a monochrome image in a predetermined color by using the first display panel, and displaying a two-dimensional image by using the second display panel.

The method includes the steps of, based on the second display panel being implemented as a self-luminous display panel, in the case of operating in a three-dimensional image display mode, acquiring a user instruction for operating in a two-dimensional image display mode, and in the case of operating in the two-dimensional image display mode, turning off the first display panel, and displaying a two-dimensional image by using the display panel.

In accordance with another aspect of the disclosure, an electronic apparatus is provided. The electronic apparatus includes a first display including a backlight unit, a transparent photo film which is arranged on a front surface of the backlight unit, and is for outputting a fixed rendering image, and a micro-lens array which is arranged on the front surface of the transparent photo film, and is output through the backlight unit and is for generating a three-dimensional image by adjusting directions of lights that passed through the transparent photo film, a second display including a second display which is arranged on the front surface of the first display and displays a two-dimensional image corresponding to a multi-view and has a transmittance greater than or equal to a predetermined value, memory storing one or more computer programs, and one or more processors communicatively coupled to the first display, the second display, and the memory.

In accordance with another aspect of the disclosure, one or more non-transitory computer-readable storage media storing computer-executable instructions that, when executed by one or more processors of an electronic apparatus, cause the electronic apparatus to perform operations are provided. The operations include acquiring a user instruction for operating in a three-dimensional image display mode, displaying a multi-view image by using a first display panel in response to the user instruction, and displaying a two-dimensional image by using a second display panel.

The transparent photo film and the micro lens-array is replaceable.

In accordance with another aspect of the disclosure, an electronic apparatus is provided. The electronic apparatus includes a first display including a display panel for outputting a multi-view image, a second display including a transparent self-luminous display panel which is arranged on a front surface of the first display and displays a two-dimensional image corresponding to the multi-view image and includes a plurality of openings, memory storing one or more computer programs, and one or more processors communicatively coupled to the first, the second display, and the memory.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR IMPLEMENTING THE INVENTION

Figure 1:
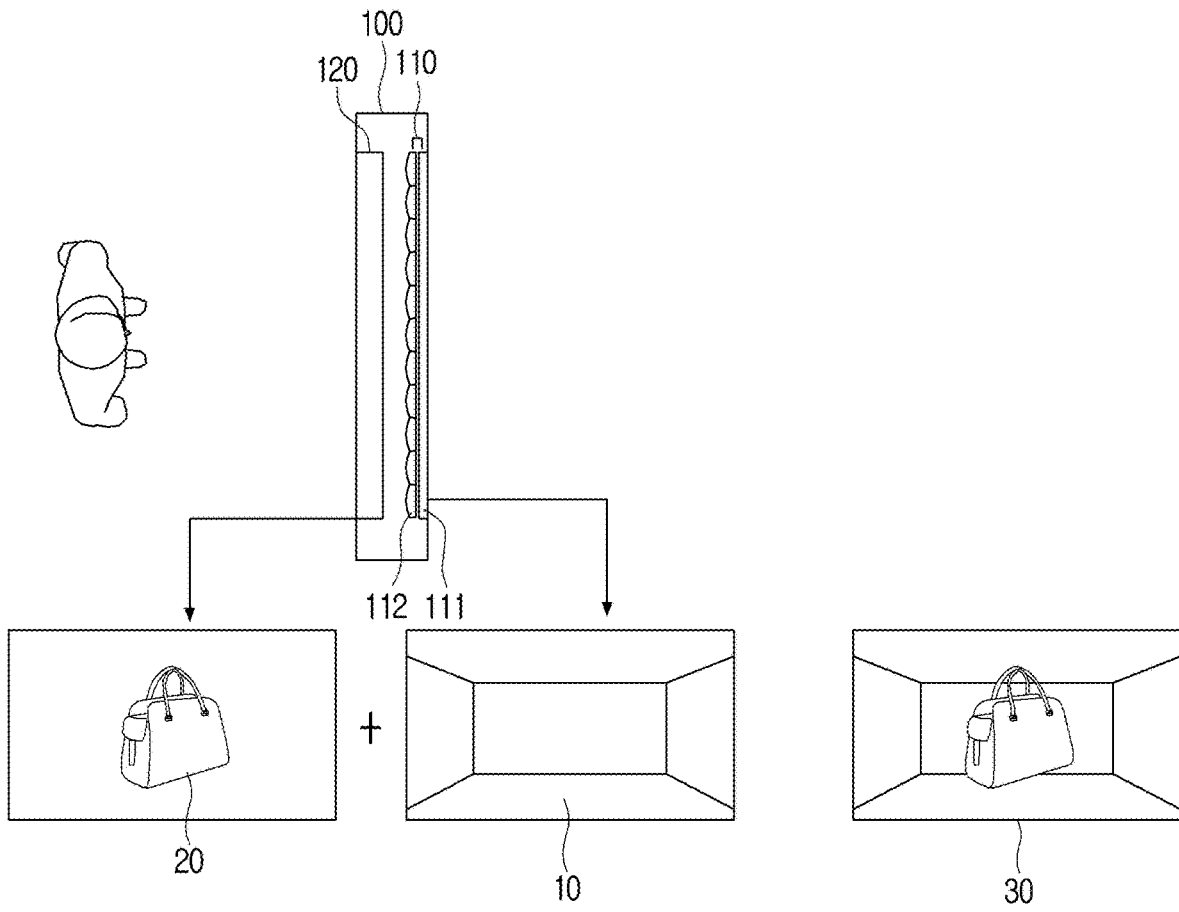
FIG. 1 is a diagram for illustrating an operation of an electronic apparatus according to an embodiment of the disclosure.

The following description with reference to the accompanying drawings is provided to assist in a comprehensive understanding various modifications of the disclosure as defined by the claims and their equivalents. It includes various specific detail to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, in describing the disclosure, in case it is determined that detailed explanation of related known functions or components may unnecessarily confuse the gist of the disclosure, the detailed explanation will be omitted.

In addition, the embodiments below may be modified in various different forms, and the scope of the technical idea of the disclosure is not limited to the embodiments below. Rather, these embodiments are provided to make the disclosure more sufficient and complete, and to fully convey the technical idea of the disclosure to those skilled in the art.

Further, terms used in the disclosure are used just to explain specific embodiments of the disclosure, and are not intended to limit the scope of the disclosure.

In addition, in the disclosure, expressions, such as "have," "may have," "include," and "may include" denote the existence of such characteristics (e.g., elements, such as numbers, functions, operations, and components), and do not exclude the existence of additional characteristics.

In addition, in the disclosure, the expressions "A or B," "at least one of A and/or B," or "one or more of A and/or B," and the like may include all possible combinations of the listed items. For example, "A or B," "at least one of A and B," or "at least one of A or B" may refer to all of the following cases: (1) including at least one A, (2) including at least one B, or (3) including at least one A and at least one B.

In addition, the expressions "first," "second," and the like used in the disclosure may describe various elements regardless of any order and/or degree of importance. In addition, such expressions are used only to distinguish one element from another element, and are not intended to limit the elements.

Meanwhile, the description in the disclosure that one element (e.g., a first element) is "(operatively or communicatively) coupled with/to" or "connected to" another element (e.g., a second element) should be interpreted to include both the case where the one element is directly coupled to another element, and the case where the one element is coupled to the other element through still another element (e.g., a third element).

In contrast, the description that one element (e.g., a first element) is "directly coupled" or "directly connected" to another element (e.g., a second element) can be interpreted to mean that still another element (e.g., a third element) does not exist between the one element and the other element.

In addition, the expression "configured to" used in the disclosure may be interchangeably used with other expressions, such as "suitable for," "having the capacity to," "designed to," "adapted to," "made to," and "capable of," depending on cases. Meanwhile, the term "configured to" may not necessarily mean that an apparatus is "specifically designed to" in terms of hardware.

Instead, under some circumstances, the expression "an apparatus configured to" may mean that the apparatus "is capable of" performing an operation together with another apparatus or component. For example, the phrase "a processor configured to perform A, B, and C" may mean a dedicated processor (e.g., an embedded processor) for performing the corresponding operations, or a generic-purpose processor (e.g., a CPU or an application processor) that can perform the corresponding operations by executing one or more software programs stored in memory device.

In addition, in the embodiments of the disclosure, 'a module' or 'a part' may perform at least one function or operation, and may be implemented as hardware or software, or as a combination of hardware and software. In addition, a plurality of 'modules' or 'parts' may be integrated into at least one module and implemented as at least one processor, excluding 'a module' or 'a part' that needs to be implemented as specific hardware.

Meanwhile, various elements and areas in the drawings were illustrated schematically. Accordingly, the technical idea of the disclosure is not limited by the relative sizes or intervals illustrated in the accompanying drawings.

Hereinafter, embodiments according to the disclosure will be described with reference to the accompanying drawings, such that a person having ordinary knowledge in the technical field to which the disclosure belongs can easily carry out the embodiments.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a diagram illustrating an electronic apparatus including a first display and a second display according to an embodiment of the disclosure.

Referring to FIG. 1, an electronic apparatus 100 may include a first display 110 and a second display 120. The electronic apparatus 100 according to an embodiment of the disclosure may be digital signage, but this is merely an example, and the electronic apparatus 100 may be implemented as various types of display apparatuses, such as a TV, a monitor, a PC, a kiosk, a tablet PC, an electronic photo frame, a mobile phone, or the like.

The first display 110 may display a multi-view image, and provide a three-dimensional image by a glasses-free method. A multi-view image may be generated based on a plurality of images that photographed (generated) the same object in different angles. For example, a plurality of images photographed on different viewpoints are refracted at different angles, and a focused image is provided in a location that is distanced by a specific distance which is a so-called viewing distance (e.g., about 3m). A location wherein such an image is formed is referred to as a viewing area (or an optical view). Accordingly, if a user's one eye is located in one first viewing area, and the other eye is located in a second viewing area, the user can feel a stereoscopic sense for an image.

According to an embodiment of the disclosure, the first display 110 may include a first display panel and a micro-lens array.

The first display panel 111 is a component for displaying a multi-view image, and it may be implemented as a liquid crystal display (LCD) panel, a light emitting diodes (LED) panel, or a self-luminous display panel (e.g., an organic light emitting diodes (OLED) panel). However, the first display panel 111 is not limited thereto, and it may be implemented as various display panels (e.g., a plasma display panel (PDP), a vacuum fluorescent display (VFD), a field emission display (FED), an electro luminescence display (ELD), or the like).

The micro-lens array 112 may be arranged on the front surface of the first display panel 111, and provide a different viewpoint, i.e., an optical view for each viewing area. Meanwhile, in the disclosure, "the front surface" direction may be a direction wherein a viewer viewing the electronic apparatus 100 is located.

The micro-lens array 112 may be arranged between the first display panel 111 and a second display panel that will be described later. Here, the micro-lens array 112 may be attached to the front surface part of the first display panel 111, or attached to the rear surface part of the second display panel.

According to an embodiment of the disclosure, as illustrated in FIG. 1, the micro-lens array 112 may be implemented as a lenticular lens. The lenticular lens may adjust directions of lights output through the first display panel 111, and provide a three-dimensional image to a user. For example, the lenticular lens may refract a light output from the first display panel 111 through a plurality of sub-lens areas. Each sub-lens area may be formed in a size corresponding to at least one pixel, and disperse lights passing through each pixel differently for each viewing area. Here, the micro-lens array 112 can obviously be implemented as a plurality of lenticular lenses wherein lenticular lens are laminated.

According to another embodiment of the disclosure, the micro-lens array 112 may be replaced by a parallax barrier. Here, the parallax barrier may be implemented as a slit array including a plurality of barrier areas. Accordingly, the micro-lens array 112 may block lights through slits among the barrier areas, and may thereby make images of different viewpoints output for each viewing area.

Meanwhile, the micro-lens array 112 and the parallax barrier according to an embodiment of the disclosure may generally be referred to as a visual field separation part.

The second display 120 is a component which is arranged on the front surface of the first display 110, and is for displaying a two-dimensional image corresponding to a multi-view image. Here, the second display 120 may include a second display panel having a transmittance greater than or equal to a predetermined value (e.g., 2%). As an example, the second display 120 may include an LCD panel or a transparent display panel (e.g., a transparent OLED panel, a transparent LED panel). However, the first display panel 111 is not limited thereto, and it may be implemented as various display panels having a transmittance greater than or equal to the predetermined value.

For processing a multi-view image to correspond to a two-dimensional image, in case a multi-view image is displayed through the first display panel 111 and a two-dimensional image is displayed through the second display panel, an area corresponding to an object included in the two-dimensional image in the multi-view image may be processed based on information on the object included in the two-dimensional image. Here, the information on the object included in the two-dimensional image may include at least one of color information, location information, or shape information of the object included in the two-dimensional image.

According to an embodiment of the disclosure, the electronic apparatus 100 may generate the multi-view image by processing the area corresponding to the object (or, a masking area) in the multi-view image in a predetermined color based on the color information of the object included in the two-dimensional image. Here, the area corresponding to the object included in the multi-view image may be greater than the area wherein the object included in the two-dimensional image is displayed. The electronic apparatus 100 may generate the two-dimensional image by processing the remaining area excluding the area wherein the object is displayed in the area corresponding to the object in the two-dimensional image in a color corresponding to the multi-view image.

In addition, according to an embodiment of the disclosure, the electronic apparatus 100 may process the multi-view image to include a shadow of the object included in the two-dimensional image in the multi-view image based on the location information and the shape information of the object included in the two-dimensional image, and the strength and the direction of a light detected through the sensor.

Meanwhile, as illustrated in FIG. 1, the first display 110 may display a multi-view image for providing a three-dimensional image 10, and the second display 120 may display a two-dimensional image 20. Here, the three-dimensional image 10 may be an image including a background wherein a stereoscopic sense was formed in the rear surface direction of the electronic apparatus 100. The two-dimensional image 20 may be an image including a two-dimensional object displayed in one area of the three-dimensional image 10. For example, the electronic apparatus 100 can display one stereoscopic image 30 through the three-dimensional image 10 provided through the first display 110 and the two-dimensional image 20 provided through the second display 120.

However, as described above, the feature that a background is included in a multi-view image, and an object is included in a two-dimensional image is merely an embodiment of the disclosure, and not only a background but also an object may be included in a multi-view image. For example, the electronic apparatus 100 may generate a multi-view image such that not only a background but also an object distinguished from an object included in a two-dimensional image (e.g., a moving text, or the like) is included in the multi-view image, and display the multi-view image.

By this, the user can feel a stereoscopic sense as if a two-dimensional object exists in a three-dimensional image (e.g., a box). More particularly, as in the technology of the related art, by displaying a two-dimensional object in a three-dimensional image without a separate physical space, an effect that the size of the electronic apparatus 100 is reduced may exist. In addition, in the case of providing a three-dimensional image by the glasses-free method, a problem that the resolution is reduced by a multi-view image exists, but as in the disclosure, by providing an object as a two-dimensional image through the second display 120, the problem that the resolution is reduced by the glasses-free method can be overcome.

Meanwhile, in the aforementioned embodiment of the disclosure, it was explained that the first display 110 provides a three-dimensional image by the glasses-free method, but this is merely an example, and a three-dimensional image may be provided by the glasses method. In the case of providing a three-dimensional image by the glasses method, the first display 110 may provide a three-dimensional image by using a stereo image including a left eye image and a right eye image.

Figure 2:
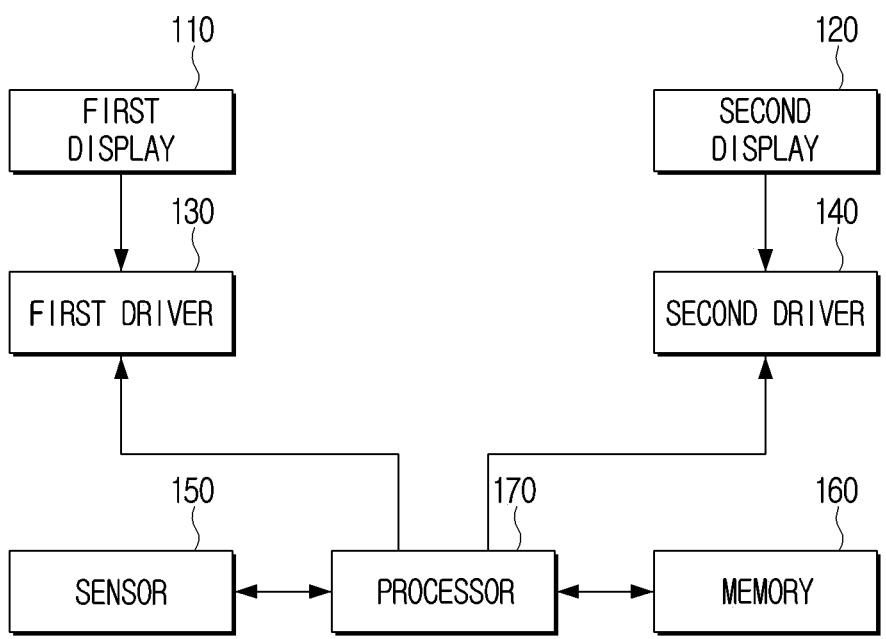
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

Referring to FIG. 2, the electronic apparatus 100 may include a first display 110, a second display 120, a first driver 130, a second driver 140, a sensor 150, memory 160, and a processor 170. Meanwhile, the components illustrated in FIG. 2 are merely an example, and it is obvious that some components can be deleted or added depending on implementation examples of the electronic apparatus 100.

The first display 110 may provide a three-dimensional image by the glasses-free method. More particularly, the first display 110 may include the first display panel 111 and the micro-lens array 112. The first display 110 may display a multi-view image by the first display driver 130, and make the user feel as if the user is viewing a three-dimensional image through the micro-lens array 112.

The second display 120 may be a component which is arranged on the front surface of the first display 110, and is for outputting a two-dimensional image. The second display 120 may display a two-dimensional image including an object by the second driver 140.

The first driver 130 may drive the first display 110 according to control by the processor 170. For example, the first driver 130 may drive each pixel by applying a driving voltage or making a driving current flow for driving each pixel constituting the first display panel 111 included in the first display 110 according to control by the processor 170. For example, the first driver 130 may provide a driving voltage (or a driving current) to the first display panel 111 by a pulse width modulation (PWM) method, and in this case, the first driver 130 outputs the driving voltage (or the driving current) provided to the first display panel 111 by adjusting the provision time or the strength, or the like, such that it corresponds to each control signal input from the processor 170.

The second driver 140 drives the second display 120 according to control by the processor 170. As explanation regarding the second driver 140 is identical to the explanation regarding the first driver 130, detailed explanation will be omitted.

Meanwhile, according to an embodiment of the disclosure, the electronic apparatus 100 may include the first driver 130 and the second driver 140, but this is merely an example, and the first and second displays 110, 120 may be driven through one driver. Here, the first and second displays 110, 120 may include display panels of the same type (e.g., LCD panels).

The sensor 150 may detect various kinds of information inside and outside the electronic apparatus 100. Specifically, the sensor 150 according to the disclosure may include a camera, a microphone, and an illumination sensor, or the like. More particularly, the illumination sensor may acquire illumination data indicating the illumination of the surrounding environment of the electronic apparatus 100. The processor 170 may acquire information on the direction and the strength of a light based on the illumination data acquired by the illumination sensor.

In the memory 160, at least one instruction for controlling the electronic apparatus 100 may be stored. In addition, in the memory 160, an operating system (O/S) for driving the electronic apparatus 100 may be stored. In addition, in the memory 160, various kinds of software programs or applications for the electronic apparatus 100 to operate according to the various embodiments of the disclosure may be stored. In addition, the memory 160 may include semiconductor memory, such as flash memory, or a magnetic storage medium, such as a hard disk, or the like.

In addition, in the memory 160, various kinds of software modules for the electronic apparatus 100 to operate according to the various embodiments of the disclosure may be stored, and the processor 170 may control the operations of the electronic apparatus 100 by executing the various kinds of software modules stored in the memory 160. For example, the memory 160 is accessed by the processor 170, and reading/recording/correction/deletion/update, or the like, of data by the processor 170 can be performed.

The memory 160 according to the disclosure may include non-volatile memory and volatile memory. Here, the non-volatile memory refers to memory that can maintain the stored information even if power supply is stopped, and the volatile memory refers to memory that needs constant power supply for maintaining the stored information.

More particularly, the memory 160 may include various modules for displaying a multi-view image through the first display 110, and displaying a two-dimensional image through the second display 120. More particularly, if a function for displaying a multi-view image through the first display 110, and displaying a two-dimensional image through the second display 120 is executed, the electronic apparatus 100 may load data regarding the various modules for displaying a multi-view image through the first display 110 stored in the non-volatile memory, and displaying a two-dimensional image through the second display 120 on the volatile memory. Here, loading means an operation of calling in data stored in the non-volatile memory to the volatile memory and storing the data, so that the processor 170 can access the data.

The processor 170 may control the electronic apparatus 100 according to at least one instruction stored in the memory 160.

More particularly, the processor 170 may include a plurality of processors. Specifically, the plurality of processors may include one or more of a central processing unit (CPU), a graphics processing unit (GPU), an accelerated processing unit (APU), a many integrated core (MIC), a digital signal processor (DSP), a neural processing unit (NPU), a hardware accelerator, or a machine learning accelerator. The plurality of processors may control one or a random combination of the other components of the electronic apparatus, and perform an operation related to communication or data processing. In addition, the plurality of processors may execute one or more programs or instructions stored in the memory. For example, the plurality of processors may perform the method according to an embodiment of the disclosure by executing at least one instruction stored in the memory.

In case the method according to an embodiment of the disclosure includes a plurality of operations, the plurality of operations may be performed by one processor, or performed by a plurality of processors. For example, when a first operation, a second operation, and a third operation are performed by the method according to an embodiment of the disclosure, all of the first operation, the second operation, and the third operation may be performed by a first processor, or the first operation and the second operation may be performed by the first processor (e.g., a generic-purpose processor), and the third operation may be performed by a second processor (e.g., an artificial intelligence-dedicated processor).

The processor 170 may be implemented as one or more multicore processors including a plurality of cores (e.g., multicores of the same kind or multicores of different kinds).

In case the processor is implemented as multicore processors, each of the plurality of cores included in the multicore processors may include internal memory of the processor, such as cache memory and on-chip memory included in the multicore processors, and a common cache shared by the plurality of cores may be included in the multicore processors. In addition, each of the plurality of cores (or some of the plurality of cores) included in the multicore processors may independently read a program instruction for implementing the method according to an embodiment of the disclosure and perform the instruction, or the plurality of entire cores (or some of the cores) may be linked with one another, and read a program instruction for implementing the method according to an embodiment of the disclosure and perform the instruction.

In case the method according to an embodiment of the disclosure includes a plurality of operations, the plurality of operations may be performed by one core among the plurality of cores included in the multicore processors, or they may be implemented by the plurality of cores. For example, when the first operation, the second operation, and the third operation are performed by the method according to an embodiment of the disclosure, all of the first operation, the second operation, and the third operation may be performed by a first core included in the multicore processors, or the first operation and the second operation may be performed by the first core included in the multicore processors, and the third operation may be performed by a second core included in the multicore processors.

According to the embodiments of the disclosure, the processor 170 may mean a system on chip (SoC) wherein at least one processor and other electronic components are integrated, a single core processor, a multicore processor, or a core included in the single core processor or the multicore processor. In addition, here, the core may be implemented as a CPU, a GPU, an APU, a MIC, a DSP, an NPU, a hardware accelerator, or a machine learning accelerator, or the like, but the embodiments of the disclosure are not limited thereto.

More particularly, the processor 170 may control the first display 110 to display a multi-view image through the first display panel 111, and control the second display 120 to display a two-dimensional image through the second display panel. Here, control of the first and second displays 110, 120 by the processor 170 may include control of the first and second displays 110, 120 through the first and second drivers 130, 140.

In addition, a plurality of processors 170 may be provided, and a first processor among the plurality of processors may control the first display 110, and the second processor may control the second display 120.

According to an embodiment of the disclosure, the processor 170 may acquire a multi-view image to provide a three-dimensional image. In addition, the processor 170 may acquire a two-dimensional image. Here, the processor 170 may acquire each of a multi-view image and a two-dimensional image through a communication interface or an input/output interface (not shown), or the like, but this is merely an example, and the processor 170 may acquire a multi-view image by reading a multi-view image and a two-dimensional image stored in the memory 160.

According to an embodiment of the disclosure, the processor 170 may acquire a multi-view image and a two-dimensional image for providing a three-dimensional image through one image. Specifically, the processor 170 may separate a foreground and a background from an input image, and extract at least one object included in the foreground. Then, the processor 170 may acquire a two-dimensional image based on the extracted at least one object. Then, the processor 170 may generate a multi-view image by using the separated background image.

The processor 170 may control the first driver 130 to output a multi-view image acquired by the various embodiments as described above through the first display panel 111. In addition, the processor 170 may control the second driver 140 to output a two-dimensional image acquired by the various embodiments as described above through the second display panel.

Meanwhile, the processor 170 according to an embodiment of the disclosure may operate in one mode from among a three-dimensional image display mode and a two-dimensional image display mode. The three-dimensional image display mode is a mode of providing a stereoscopic image by using a multi-view image provided through the first display 110 and a two-dimensional image provided through the second display 120, and the two-dimensional image display mode is a mode of providing a two-dimensional image through the second display 120 without providing a multi-view image through the first display 110.

According to an embodiment of the disclosure, in case the first display panel 111 and the second display panel are implemented as LCD panels, the processor 170 may, while operating in the three-dimensional image display mode, control the first display 110 to display a multi-view image by using the first display panel 111, and control the second display 120 to display a two-dimensional image by using the second display panel. In addition, the processor 170 may, while operating in the two-dimensional image display mode, control the first display 110 to display a monochrome image of a predetermined color (e.g., a white color) by using the first display panel 111, and control the second display 120 to display a two-dimensional image by using the second display panel. Here, the monochrome image output through the first display panel 111 may perform a role of a backlight of the second display panel.

In addition, according to an embodiment of the disclosure, in case the second display panel is implemented as a self-luminous display panel, the processor 170 may, while operating in the three-dimensional image display mode, control the first display 110 to display a multi-view image by using the first display panel 111, and control the second display 120 to display a two-dimensional image by using the second display panel. Then, the processor 170 may, while operating in the two-dimensional image display mode, turn off the first display panel 111, and control the second display 120 to display a two-dimensional image by using the second display panel. For example, in case the second display 120 is implemented as a transparent self-luminous display panel, it does not need a separate backlight, and thus the second display 120 may be turned off. However, this is merely an example, and for improving the resolution of the second display 120, an additional image (e.g., a monochrome image) may be displayed through the first display 110.

Further, in case the second display 120 is implemented as a self-luminous display panel, there may be a case wherein it is difficult for the second display 120 to express a predetermined color (e.g., a black color). Not only that, in case the pixel resolution of the first display 110 is smaller than that of the second display 120, there is a problem that it is difficult to implement a color to be expressed by the first display 110 correctly by the second display 120.

Accordingly, in case the second display 120 is implemented as a self-luminous display panel, and the pixel resolution of the first display 110 is smaller than that of the second display 120, the processor 170 may generate a multi-view image by processing an area corresponding to an object in the multi-view image in a predetermined color, for expressing the object included in a two-dimensional image in the predetermined color (e.g., a black color).

Here, the area corresponding to the object included in the multi-view image may be bigger than the area wherein the object included in the two-dimensional image is displayed. Accordingly, the processor 170 may generate the two-dimensional image by processing the remaining area excluding the area wherein the object is displayed in the area corresponding to the object in the two-dimensional image in a color corresponding to the multi-view image. By this, the multi-view image and the two-dimensional image may be displayed without a sense of difference.

In addition, the processor 170 may process the multi-view image to include a shadow of the object included in the two-dimensional image in the multi-view image based on location information and shape information of the object, and the strength and the direction of a light detected through the sensor 150. For example, the processor 170 may adjust the brightness of the shadow of the object in the multi-view image according to the strength of a light detected through the sensor 150. For example, as the strength of the detected light is bigger, the processor 170 may adjust the brightness of the shadow of the object in the multi-view image to be darker, and as the strength of the detected light is smaller, the processor 170 may adjust the brightness of the shadow of the object in the multi-view image to be brighter. In addition, the processor 170 may adjust the location of the shadow of the object in the multi-view image according to the direction of the light detected through the sensor 150.

Hereinafter, various embodiments of the disclosure will be described with reference to FIGS. 3A to 3E, 4A, 4B, 5 to 7, 8A, 8B, 9, 10, and 11.

FIGS. 3A, 3B, 3C, 3D, and 3E are diagrams for illustrating multi-view images expressing various spaces according to various embodiments of the disclosure.

Figure 3A:
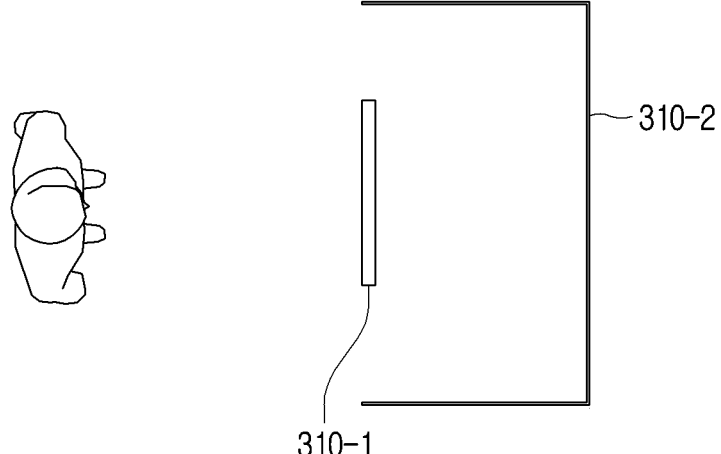
FIGS. 3A, 3B, 3C, 3D, and 3E are diagrams for illustrating multi-view images expressing various spaces according to various embodiments of the disclosure.

Referring to FIGS. 3A, 3B, 3C, 3D, and 3E, the electronic apparatus 100 may display a two-dimensional image according to a multi-view image having various depths. As an example, the electronic apparatus 100 may generate a multi-view image to express a rear surface space. For example, the electronic apparatus 100 may display a multi-view image expressing a rear surface space through the first display 110, and display a two-dimensional image displayed together with the multi-view image through the second display 120. By this, as illustrated in FIG. 3A, the electronic apparatus 100 may provide a three-dimensional image wherein it is felt as if an object 310-1 included in the two-dimensional image is displayed in the front part of a three-dimensional background 310-2 formed by the multi-view image.

Figure 3B:
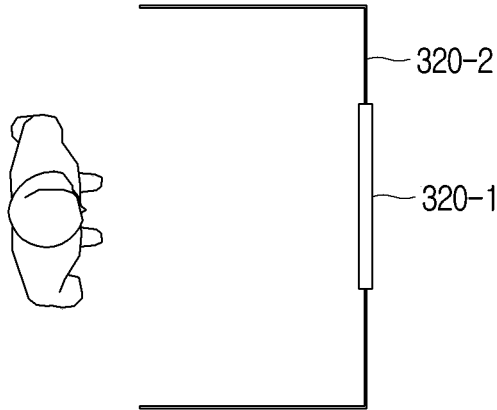

As an example, the electronic apparatus 100 may display a multi-view image to express a front surface space. For example, the electronic apparatus 100 may display a multi-view image expressing a front surface space through the first display 110, and display a two-dimensional image displayed together with the multi-view image through the second display 120. By this, as illustrated in FIG. 3B, the electronic apparatus 100 may provide a three-dimensional image wherein it is felt as if an object 320-1 included in the two-dimensional image is displayed in the rear part of a three-dimensional background 320-2 formed by the multi-view image.

In addition, as an example, the electronic apparatus 100 may display a multi-view image to express front surface/rear surface spaces at the same time. For example, the electronic apparatus 100 may display a multi-view image expressing front surface/rear surface spaces through the first display 110, and display a two-dimensional image displayed together with the multi-view image through the second display 120. By this, as illustrated in FIG. 3C, the electronic apparatus 100 may provide a three-dimensional image wherein it is felt as if an object 330-1 included in the two-dimensional image is displayed in the center part of a three-dimensional background 330-2 provided by the multi-view image.

Further, as an example, the electronic apparatus 100 may display a multi-view image such that an object is arranged on the outer rim of a three-dimensional background. For example, as illustrated in FIG. 3D, the electronic apparatus 100 may provide a three-dimensional image wherein it is felt as if an object 330-4 included in the two-dimensional image is displayed in the outer rim area of the front surface of a three-dimensional background 330-3 provided by the multi-view image.

Meanwhile, in case a two-dimensional image was input into the electronic apparatus 100, the electronic apparatus 100 may separate a foreground area and a background image from the two-dimensional image. Here, the electronic apparatus 100 may acquire depth information of the background image together with the background image. Here, the depth information is information indicating the depth of a three-dimensional image, and is information corresponding to the degree of binocular disparity between a left eye image and a right eye image constituting the three-dimensional image. The degree of a stereoscopic sense felt by a person varies according to the depth information. For example, in case the depth is big, the binocular disparity between the left eye and the right eye becomes big, and thus a stereoscopic sense is felt to be relatively bigger, and in case the depth is small, the binocular disparity between the left eye and the right eye becomes small, and thus a stereoscopic sense is felt to be relatively smaller. The depth information may generally be acquired through a manual method of acquiring the depth only with a two-dimensional characteristic of an image, such as stereo matching, and an active method of using a device, such as a depth camera. Meanwhile, the depth information may be in a form of a depth map. Here, the depth map means a table including depth information for each area of an image. The areas may be divided in pixel units, or may be defined by predetermined areas bigger than pixel units. According to an embodiment of the disclosure, the depth map may be in a form of using 127 or 128 among grayscale values of from 0 to 255 as a reference value, i.e., 0 (or a focal plane), and indicating a value smaller than 127 or 128 as a − value, and indicating a value bigger than 127 or 128 as a + value. The reference value of the focal plane may be randomly selected between 0 and 255. Here, a − value means precipitation, and a + value means projection.

Figure 3C:
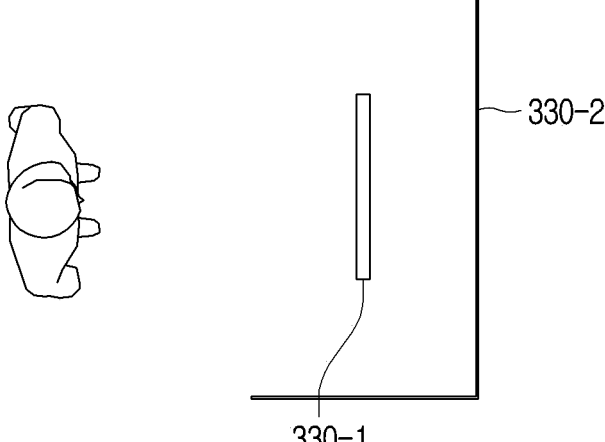
Figure 3D:
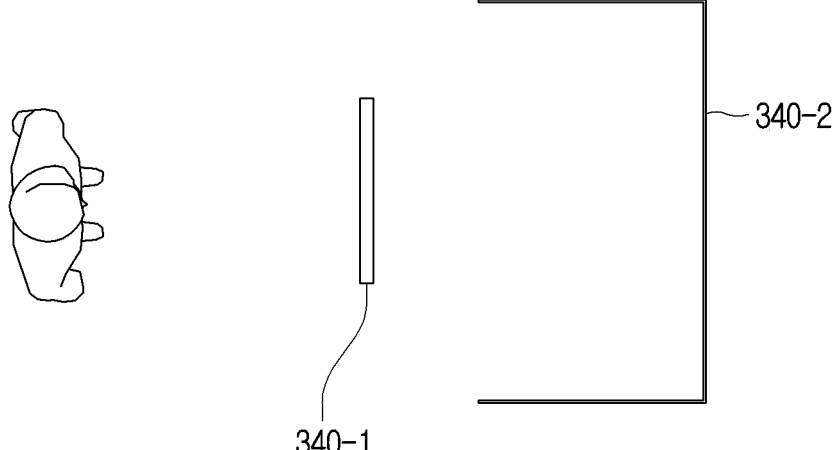

The electronic apparatus 100 may provide a background image (i.e., a multi-view image) in various depths according to the depth information of the background image, as described in FIGS. 3A to 3C. Here, the depth information may be received together with an input two-dimensional image, but this is merely an example, and the depth information may be acquired by analyzing an input two-dimensional image, or acquired according to a user input.

Further, the electronic apparatus 100 may generate a multi-view image by rendering a plurality of image views on different viewpoints based on the acquired depth information. Alternatively, in case a plurality of image views on different viewpoints and a plurality of corresponding depth information are input, the electronic apparatus 100 may render image views of a predetermined number (referred to as N hereinafter) based on at least one image view and depth information among the plurality of input image views and depth information, and generate a multi-view image. Alternatively, in case only a plurality of image views on different viewpoints are input, the electronic apparatus 100 may extract depth information from the plurality of image views, and then render N image views based on the extracted depth information and generate a multi-view image.

As an example, the electronic apparatus 100 may select a three-dimensional image, i.e., one from among a left eye image and a right eye image as a reference view (or a center view), and generate a leftmost view and a rightmost view which become the bases of a multi-view image. In this case, the electronic apparatus 100 may generate the leftmost view and the rightmost view based on corrected depth information corresponding to one of the left eye image and the right eye image selected as the reference view. When the leftmost view and the rightmost view are generated, the electronic apparatus 100 may generate a plurality of interpolation views between the center view and the leftmost view, and generate a plurality of interpolation views between the center view and the rightmost view, and may thereby render N image views. However, the disclosure is not limited thereto, and it is also possible to generate an extrapolation view generated by an extrapolation technic. Meanwhile, in the case of generating a multi-view image based on a two-dimensional image and the depth information, it is obvious that the electronic apparatus 100 can select the two-dimensional image as a center view. However, the aforementioned rendering operation is merely an example, and it is obvious that a plurality of image views can be rendered by various methods other than the aforementioned rendering operation. Depending on cases, the electronic apparatus 100 may adjust depth information of an input image according to various standard based on the depth information, and in this case, the electronic apparatus 100 may render a plurality of image views based on the image of which depth information has been adjusted.

The electronic apparatus 100 may generate a multi-view image to be displayed through the first display panel 111 based on values of sub-pixels constituting a plurality of rendered image views on different viewpoints.

Figure 3E:
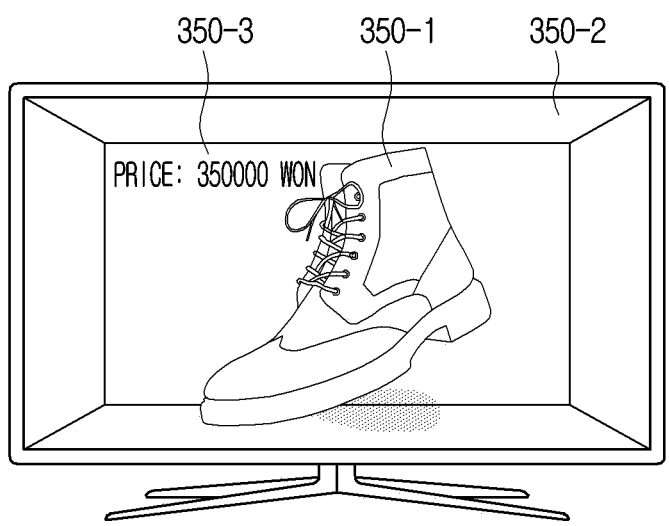

Meanwhile, in the aforementioned embodiments of the disclosure, it was explained that a multi-view image provides only a three-dimensional background, but this is merely an example, and a multi-view image may include not only a three-dimensional background but also various three-dimensional objects. As an example, as illustrated in FIG. 3E, the electronic apparatus 100 can obviously display not only an object 350-1 included in a two-dimensional image, but also a three-dimensional background 350-2 and a three-dimensional object 350-3 together through a multi-view image. Here, the three-dimensional object 350-3 may be a text, but this is merely an example, and it is obvious that the object can be implemented as other images, icons, or the like.

In addition, the electronic apparatus 100 may operate in one of the three-dimensional image display mode or the two-dimensional image display mode. Here, the electronic apparatus 100 may operate in one of the plurality of modes according to a user input, but this is merely an example, and the electronic apparatus 100 may operate in one of the plurality of modes according to the type of an input image. For example, in case an input image is a two-dimensional image, the electronic apparatus 100 may operate in the two-dimensional image display mode, and in case an input image is a three-dimensional image including a multi-view image and a two-dimensional image, the electronic apparatus 100 may operate in the three-dimensional image display mode.

Here, the electronic apparatus 100 may operate in the two-dimensional image display mode by different methods according to the types of the first and second displays 110, 120 included in the electronic apparatus 100.

Figure 4A:
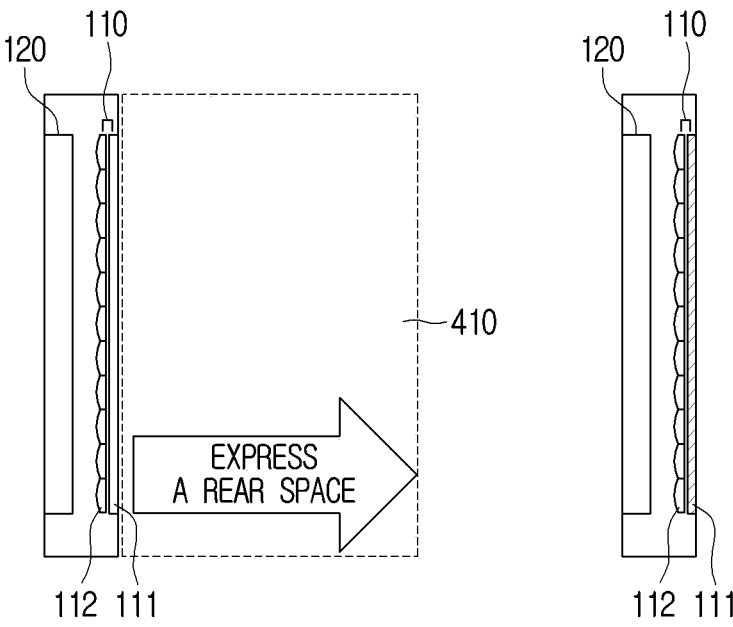
FIGS. 4A and 4B are diagrams for illustrating a three-dimensional image display mode and a two-dimensional image display mode according to various embodiments of the disclosure.

FIG. 4A is a diagram for illustrating a method for operating in a three-dimensional image display mode and a two-dimensional image display mode in case both of a first display and a second display are implemented as LCD panels according to an embodiment of the disclosure.

Referring to FIG. 4A, as illustrated on the left side of FIG. 4A, in case the electronic apparatus 100 operates in the three-dimensional image display mode, the electronic apparatus 100 may display a multi-view image expressing a rear surface space 410 by using the first display panel 111, and display a two-dimensional image by using the second display panel. Meanwhile, as illustrated on the right side of FIG. 4A, in case the electronic apparatus 100 operates in the two-dimensional image display mode, the electronic apparatus 100 may display a monochrome image in a predetermined color by using the first display panel 111, and display a two-dimensional image by using the second display panel. For example, in the case of operating in the two-dimensional image display mode, the first display panel 111 may not be turned off and display a monochrome image in a predetermined color (e.g., a white color), and may thereby provide a backlight function of the second display 120.

Figure 4B:
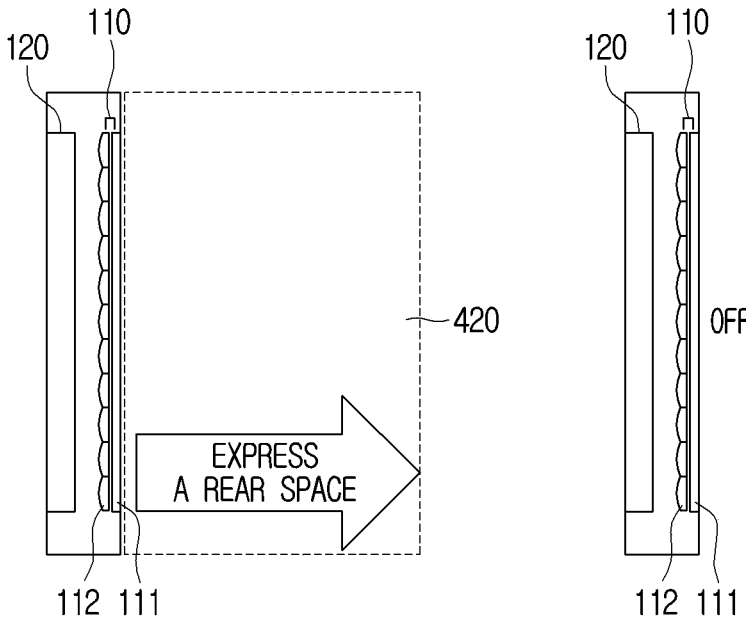

FIG. 4B is a diagram for illustrating a method for operating in a three-dimensional image display mode and a two-dimensional image display mode in case a first display is implemented as an LCD panel and a second display is implemented as a transparent self-luminous display panel according to an embodiment of the disclosure.

Referring to FIG. 4B, as illustrated on the left side of FIG. 4B, in case the electronic apparatus 100 operates in the three-dimensional image display mode, the electronic apparatus 100 may display a multi-view image expressing a rear surface space 420 by using the first display panel 111, and display a two-dimensional image by using the second display panel. Meanwhile, as illustrated on the right side of FIG. 4B, in case the electronic apparatus 100 operates in the two-dimensional image display mode, the electronic apparatus 100 may turn off the first display panel 111, and display a two-dimensional image by using the second display panel. For example, in case the second display 120 is implemented as a transparent self-luminous display panel, a separate backlight is not needed, and thus the first display panel 111 may be turned off in case the electronic apparatus 100 operates in the two-dimensional image display mode.

Figure 5:
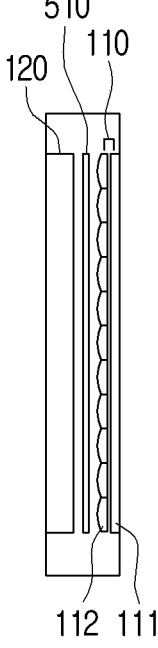
FIG. 5 is a diagram illustrating an electronic apparatus including a polarizer according to an embodiment of the disclosure.

FIG. 5 is a diagram illustrating an electronic apparatus including a polarizer according to an embodiment of the disclosure.

Referring to FIG. 5, in case the second display 120 on the front surface is implemented as a transparent self-luminous display panel, and the first display 110 on the rear surface is implemented as an LCD panel, the electronic apparatus 100 may further include a polarizer 510 as a polarization adjustment part between the first display 110 and the second display 120, as illustrated in FIG. 5. Here, the polarizer performs a role of changing lights introduced in various directions to lights vibrating in one direction, and making the lights pass through. For example, a light of which direction coincides with the polarizer may pass through, and on the contrary, another light of which direction is different may be blocked. More particularly, while the electronic apparatus 100 operates in the two-dimensional image display mode, the polarizer 510 may block lights in some directions, and make only some lights pass through, and can thereby improve the contrast ratio. Meanwhile, in the aforementioned embodiment of the disclosure, it was explained that the polarization adjustment part is implemented as the polarizer, but this is merely an example, and it may be implemented as a different feature, such as a waveplate.

Figure 6:
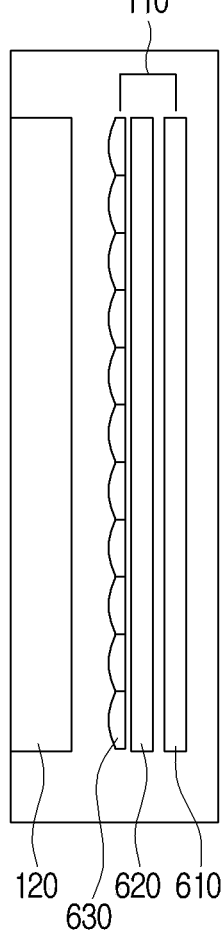
FIG. 6 is a diagram for illustrating an electronic apparatus including a replaceable transparent film according to an embodiment of the disclosure.

FIG. 6 is a diagram for illustrating an electronic apparatus including a replaceable transparent film according to an embodiment of the disclosure.

Referring to FIG. 6, the first display 110 of the electronic apparatus 100 according to an embodiment of the disclosure may include a backlight unit 610, a transparent photo film 620, and a micro-lens array 630.

Here, the backlight unit 610 may provide a light to the transparent photo film 620.

The transparent photo film 620 is located on the front surface of the backlight unit 610, and a fixed rendering image is printed for outputting the fixed rendering image. Here, the fixed rendering image may be provided as a background image in a three-dimensional form through the micro-lens array 630.

The micro-lens array 630 may be arranged on the front surface of the transparent photo film 620, and may adjust the directions of lights that were output through the backlight unit 610 and passed through the transparent photo film 620, and provide a three-dimensional image to the user through a multi-view image.

Here, the transparent photo film 620 and the micro-lens array 630 may be replaceable. For example, a new background image may be provided by replacing the fixed rendering image included in the transparent photo film 620 with another transparent photo film. By this, a background image in a three-dimensional form can be provided by replacing the cheap transparent photo film 620.

Meanwhile, in the aforementioned embodiment of the disclosure, it was explained that both of the transparent photo film 620 and the micro-lens array 630 are replaced, but this is merely an example, and only the transparent photo film 620 may be replaced.

Figure 7:
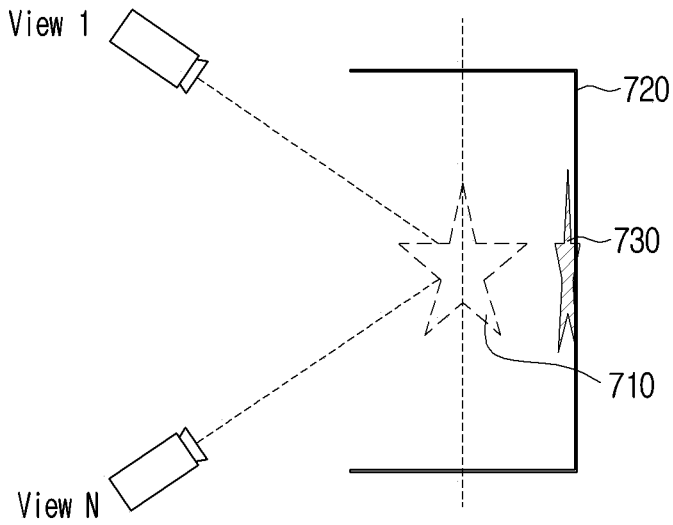
FIG. 7 is a diagram for illustrating a multi-view image including a shadow according to an embodiment of the disclosure.

FIG. 7 is a diagram for illustrating a multi-view image including a shadow according to an embodiment of the disclosure.

Referring to FIG. 7, the electronic apparatus 100 may display a shadow corresponding to a two-dimensional image together with a multi-view image. For example, as illustrated in FIG. 7, the electronic apparatus 100 may display a shadow 730 corresponding to an object 710 viewed on a plurality of viewpoints inside a background image 720 in a three-dimensional form.

More particularly, the electronic apparatus 100 may acquire information on the object 710 included in the two-dimensional image. Here, the electronic apparatus 100 may analyze the two-dimensional image, and acquire shape information and location information on the object 710. Then, the electronic apparatus 100 may render the shadow 730 corresponding to the object in the multi-view image based on the obtained shape information and location information on the object. Then, the electronic apparatus 100 may output the multi-view image including the shadow 730 through the first display 110.

In addition, the electronic apparatus 100 may process the multi-view image to include the shadow corresponding to the object included in the two-dimensional image in the multi-view image based on the strength and the direction of a light detected through the sensor 150.

Specifically, the electronic apparatus 100 may acquire information on the strength and the direction of a light based on a sensing value acquired through the sensor 150. Then, the electronic apparatus 100 may analyze the two-dimensional image, and acquire the shape information and the location information on the object. Then, the electronic apparatus 100 may render the shadow corresponding to the object in the multi-view image based on the information on the strength and the direction of the light and the shape information and the location information on the object. Specifically, the electronic apparatus 100 may render the shadow such that the brightness of the shadow increases as the strength of the light is brighter, and render the shadow such that the brightness of the shadow decreases as the strength of the light is darker. In addition, the electronic apparatus 100 may render the shadow by determining the location of the shadow according to the location of the light and the location of the object. Then, the electronic apparatus 100 may display the multi-view image including the shadow 730 through the first display 110.

Figure 8A:
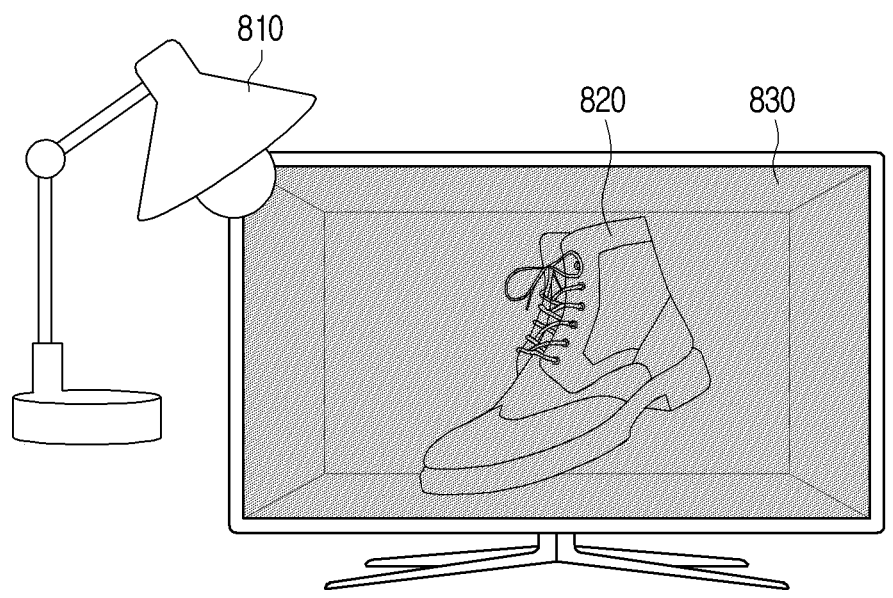
FIGS. 8A and 8B are diagrams for illustrating a multi-view image including a shadow according to a lighting according to various embodiments of the disclosure.
Figure 8B:
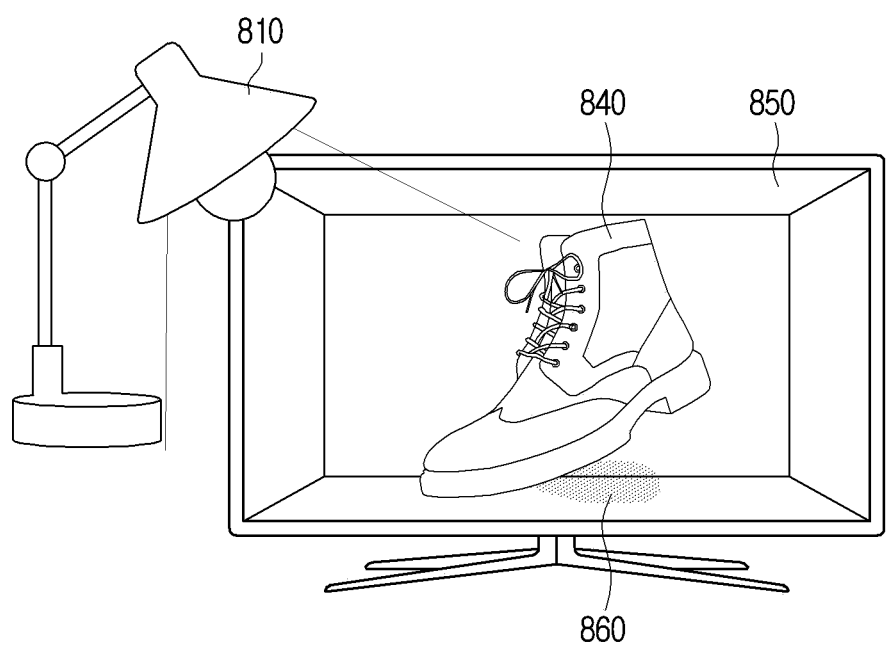

FIGS. 8A and 8B are diagrams for illustrating a multi-view image including a shadow according to a lighting according to various embodiments of the disclosure.

Referring to FIG. 8A, in case the lighting 810 was turned off, the electronic apparatus 100 may acquire information that a light is not detected through the sensor 150. Accordingly, the electronic apparatus 100 may display a multi-view image 830 by using the first display panel 111 without a separate shadow, and display a two-dimensional image including an object 820 by using the second display panel.

Meanwhile, referring to FIG. 8B, in case the lighting 810 was turned on, the electronic apparatus 100 may detect a light through the sensor 150, and acquire information on the strength and the direction of the detected light. Then, the electronic apparatus 100 may render a shadow 860 in a multi-view image 850 based on the acquired information on the strength and the direction of the light, and display the multi-view image 850 including the shadow 860 through the first display panel 111, and display a two-dimensional image including an object 840 by using the second display panel. For example, as the lighting 810 is located in the upper area of the electronic apparatus 100, the electronic apparatus 100 may render the shadow 860 in the lower part of the object 840 included in the two-dimensional image, and display the multi-view image 850.

As described above, by rendering a shadow and displaying it in a multi-view image, a user can view a more realistic three-dimensional image.

Figure 9:
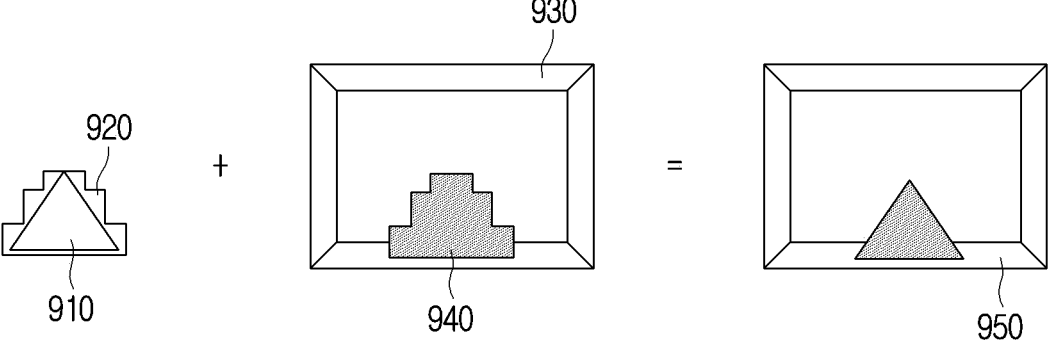
FIG. 9 is a diagram for illustrating a multi-view image including a masking area according to an embodiment of the disclosure.

FIG. 9 is a diagram for illustrating a multi-view image including a masking area according to an embodiment of the disclosure. Meanwhile, according to an embodiment of the disclosure, the second display 120 of the electronic apparatus 100 may include a transparent self-luminous display panel.

Referring to FIG. 9 Referring to FIG. 4A, in case the second display 120 is implemented as a transparent self-luminous display panel, there is a problem that it is difficult for the electronic apparatus 100 to express a black object. In addition, in case the pixel resolution provided by the first display 110 on the rear surface is smaller than that of the second display 120 on the front surface, a limitation that it is difficult for the electronic apparatus 100 to display an object in a desired color exists, since a multi-view image of the first display 110 and a two-dimensional image of the second display 120 are displayed to be overlapped.

Accordingly, for expressing an object included in a two-dimensional image in a predetermined color (e.g., a black color), as illustrated in FIG. 9, the electronic apparatus 100 may generate a multi-view image 930 including a masking area 940 wherein an area corresponding to an object in the multi-view image 930 is processed in the predetermined color. Here, the masking area 940 is an area corresponding to the object included in the two-dimensional image in the multi-view image, and it may be an area that is rendered to be distinguished from the other areas in the multi-view image such that the object is displayed in the color desired by the user. Here, the masking area may be bigger than the area wherein the object included in the two-dimensional image is displayed. In case the object included in the two-dimensional image and the masking area are identical, a sense of difference may be generated between the boundary part of the object and the background area, and thus the masking area may be set to be bigger than the area wherein the object is displayed. Here, as illustrated in the first drawing in FIG. 9, the electronic apparatus 100 may generate the two-dimensional image by processing a remaining area 920 excluding an area 910 wherein the object is displayed in the area corresponding to the masking area in the two-dimensional image in a color corresponding to the multi-view image 930.

Accordingly, the electronic apparatus 100 may display a three-dimensional image 950 including the object in the color desired by the user as in the third drawing in FIG. 9, by displaying the two-dimensional image as in the first drawing in FIG. 9 and the multi-view image as in the second drawing in FIG. 9 to be overlapped.

Figure 10:
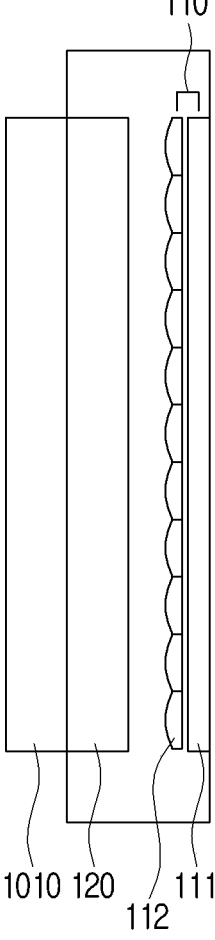
FIG. 10 is a diagram for illustrating an electronic apparatus including a viewing angle limiting film according to an embodiment of the disclosure.

FIG. 10 is a diagram for illustrating an electronic apparatus including a viewing angle limiting film according to an embodiment of the disclosure.

Referring to FIG. 10, the electronic apparatus 100 may further include a viewing angle limiting film 1010 on the front surface of the second display 120.

Specifically, through the first display 110 by the glasses-free method, a three-dimensional image cannot be viewed if it is beyond a limit viewing angle. In the case of going beyond the limit viewing angle, the viewer views a distorted image that is not a three-dimensional image. Here, the viewing angle limiting film 1010 may be located on the front surface of the second display 120, and perform a role of making an image that is beyond the limit viewing angle that can be provided by the first display 110 not viewed.

Figure 11:
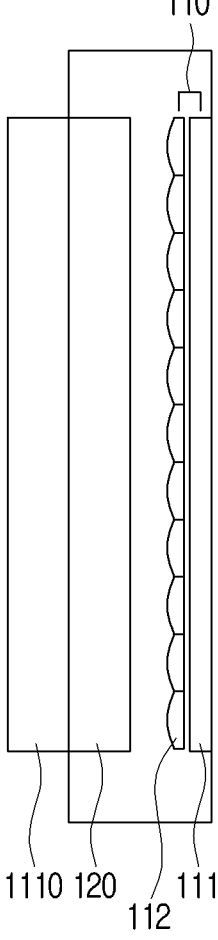
FIG. 11 is a diagram for illustrating an electronic apparatus including a circular polarizer according to an embodiment of the disclosure.

FIG. 11 is a diagram for illustrating an electronic apparatus including a circular polarizer according to an embodiment of the disclosure.

Referring to FIG. 11, the electronic apparatus 100 may further include a circular polarizer 1110 on the front surface of the second display 120.

Specifically, in case the second display 120 is located on the front surface, and the first display 110 is located on the rear surface, a problem that it is difficult to implement an image desired by the user correctly due to an internal reflective light may occur. Accordingly, the circular polarizer 1110 may be located on the front surface of the second display 120 and shield an internal reflective light, and can thereby prevent the internal reflective light from being emitted to the outside. Accordingly, an effect that the contrast ratio of a three-dimensional image provided by the electronic apparatus 100 is improved may be generated.

Figure 12A:
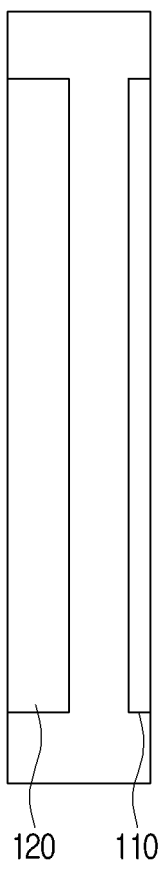
FIGS. 12A and 12B are diagrams for illustrating an electronic apparatus including a transparent self-luminous display panel performing a role of a barrier according to various embodiments of the disclosure.
Figure 12B:
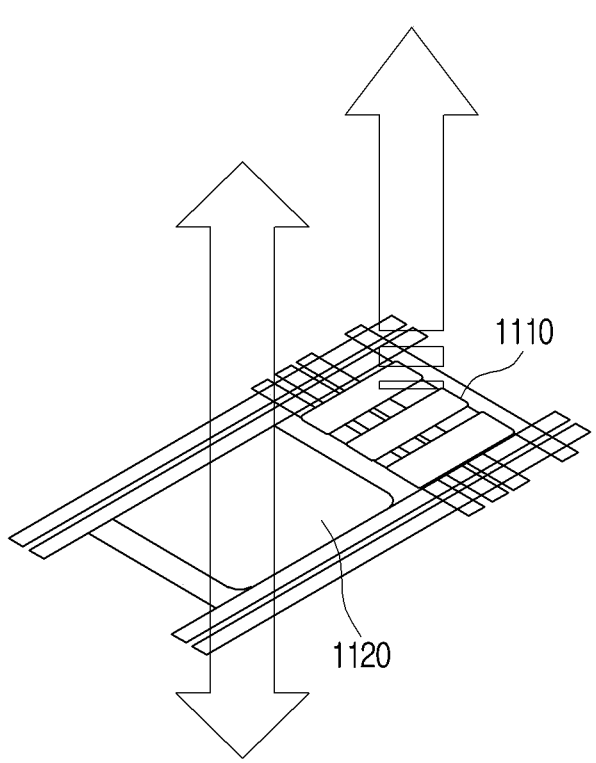

FIGS. 12A and 12B are diagrams for illustrating an electronic apparatus including a transparent self-luminous display panel performing a role of a barrier according to various embodiments of the disclosure.

Referring to FIGS. 12A and 12B, as described above, a display by the glasses-free method may include not only an embodiment wherein images of different viewpoints are made to be emitted through a micro-lens array, such as a lenticular lens array, but also a transparent slit array including a plurality of barrier areas. For example, the display may block lights through slits among the barrier areas, and may thereby make images of different viewpoints emitted for each viewing area.

According to an embodiment of the disclosure, the electronic apparatus 100 may include the first display 110 and the second display 120, as illustrated in FIG. 12A. Here, the first display 110 may include only a general display panel that does not include a micro-lens array as described above. In addition, the second display 120 may be implemented as a transparent self-luminous display panel.

Here, the transparent self-luminous display panel may include a plurality of pixel modules. Here, each of the pixel modules may include a pixel area and an opening area 1120 as illustrated in FIG. 12B. The pixel area of each pixel module may display a display image (in particular, a two-dimensional image), and the opening area 1120 may block some lights output through the first display 110, and may thereby make images of different viewpoints emitted for each viewing area. For example, the transparent self-luminous display panel may include a plurality of openings performing a role of a parallax barrier.

Accordingly, the electronic apparatus 100 can provide a background image in a three-dimensional form without a separate micro-lens array.

Meanwhile, the shape of the opening may be a straight line, a stair shape, and a curved line, but this is merely an example, and the opening can obviously be implemented in various shapes.

Figure 13:
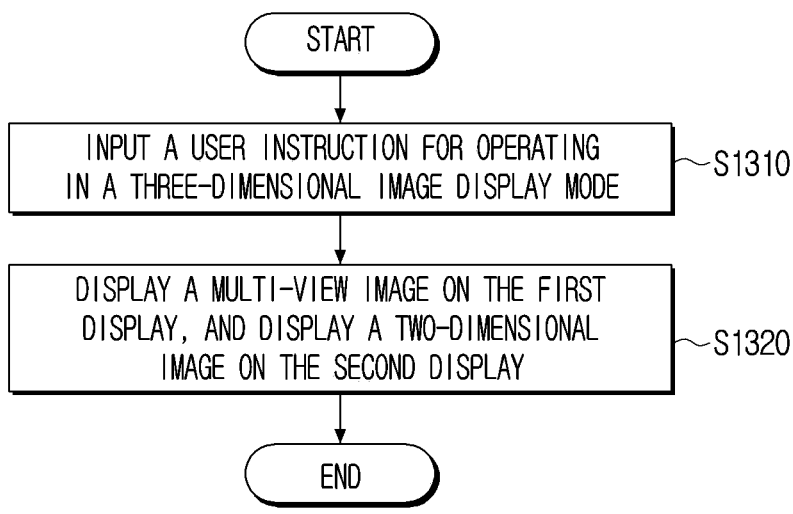
FIG. 13 is a flow chart for illustrating a method for controlling an electronic apparatus according to an embodiment of the disclosure.

FIG. 13 is a flow chart for illustrating a method for controlling an electronic apparatus according to an embodiment of the disclosure.

Referring to FIG. 13, the electronic apparatus 100 receives an input of a user instruction for operating in a three-dimensional image display mode in operation S1310. Here, the user instruction for operating in the three-dimensional image display mode may be an instruction for turning on the power of the electronic apparatus 100, or an instruction for converting the mode of the electronic apparatus 100 to the three-dimensional image display mode, but is not limited thereto.

The electronic apparatus 100 displays a multi-view image on the first display 110, and displays a two-dimensional image on the second display 120 in operation 81320.

For example, the first display 110 may display a multi-view image for providing a background image including a background wherein a stereoscopic sense is formed in the rear surface direction of the electronic apparatus 100, and the second display 120 may display a two-dimensional image including a two-dimensional object displayed in one area of the multi-view image. By this, the electronic apparatus 100 may display one stereoscopic image through the background image in the three-dimensional form displayed through the first display 110 and the object in the two-dimensional form displayed through the second display 120.

By this, the user can feel a stereoscopic sense as if the two-dimensional object exists in the background image in the three-dimensional form (e.g., a box). More particularly, as in the technology of the related art, an effect that the size of the electronic apparatus 100 is reduced may exist as the two-dimensional object is displayed in the three-dimensional image without a separate physical space. In addition, in the case of providing a three-dimensional image by the glasses-free method, a problem that the resolution is reduced by a multi-view image exists, but as in the application, an object is provided as a two-dimensional image through the second display 120, and thus the problem that the resolution is reduced by the glasses-free method can be overcome.

Meanwhile, the method according to the various embodiments of the disclosure may be provided while being included in a computer program product. A computer program product refers to a product, and it can be traded between a seller and a buyer. A computer program product can be distributed in the form of a storage medium that is readable by machines (e.g., compact disc read only memory (CD-ROM)), or may be distributed directly between two user devices (e.g., smartphones), and distributed on-line (e.g., download or upload) through an application store (e.g., Play Store™). In the case of on-line distribution, at least a portion of a computer program product (e.g., a downloadable app) may be stored in a storage medium, such as the server of the manufacturer, the server of the application store, and the memory of the relay server at least temporarily, or may be generated temporarily.

In addition, the method according to the various embodiments of the disclosure may be implemented as software including instructions stored in machine-readable storage media, which can be read by machines (e.g., computers). The machines refer to apparatuses that call instructions stored in a storage medium, and can operate according to the called instructions, and the apparatuses may include an electronic apparatus according to the aforementioned embodiments (e.g., a TV).

Meanwhile, a storage medium that is readable by machines may be provided in the form of a non-transitory storage medium. Here, the term 'a non-transitory storage medium' only means that the apparatus is a tangible apparatus, and does not include signals (e.g., electromagnetic waves), and the term does not distinguish a case wherein data is stored semi-permanently in a storage medium and a case wherein data is stored temporarily. For example, 'a non-transitory storage medium' may include a buffer wherein data is temporarily stored.

In case an instruction as described above is executed by a processor, the processor may perform a function corresponding to the instruction by itself, or by using other components under its control. An instruction may include a code that is generated or executed by a compiler or an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   a first display comprising a first display panel for displaying a multi-view image and a micro-lens array which is arranged on a front surface of the first display panel and is for adjusting directions of lights output through the first display panel;
   a second display comprising a second display panel which is arranged in front of the front surface of the first display and displays a two-dimensional image corresponding to the multi-view image and has a transmittance greater than or equal to a predetermined value;
   an illumination sensor;
   memory storing one or more computer programs; and one or more processors communicatively coupled to the first display, the second display, the illumination sensor, and the memory, wherein the one or more computer programs include computer-executable instructions that, when executed by the one or more processors, cause the electronic apparatus to:

control the illumination sensor to detect a light external to the electronic apparatus, determine a strength of the light and a direction of the light, identify an object included in the two-dimensional image, and process the multi-view image to include a shadow of the object based on location information of the object, shape information of the object, the strength of the light, and the direction of the light.

2. The electronic apparatus of claim 1, wherein the one or more computer programs include computer-executable instructions that, when executed by the one or more processors, further cause the electronic apparatus to:

based on the multi-view image being displayed through the first display panel and the two-dimensional image being displayed through the second display panel, process an area corresponding to the object in the multi-view image based on information on the object included in the two-dimensional image.

3. The electronic apparatus of claim 2, wherein the one or more computer programs include computer-executable instructions that, when executed by the one or more processors, further cause the electronic apparatus to:

based on the second display panel being implemented as a self-luminous display panel, and a pixel resolution of the first display panel being smaller than the pixel resolution of the second display panel, generate the multi-view image by processing the area corresponding to the object in the multi-view image in a predetermined color based on color information of the object included in the two-dimensional image.

4. The electronic apparatus of claim 3, wherein the area corresponding to the object included in the multi-view image is greater than an area wherein the object included in the two-dimensional image is displayed, and wherein the one or more computer programs include computer-executable instructions that, when executed by the one or more processors, further cause the electronic apparatus to:

generate the two-dimensional image by processing remaining area excluding the area wherein the object is displayed in the area corresponding to the object in the two-dimensional image in a color corresponding to the multi-view image.

5. The electronic apparatus of claim 1, wherein the one or more computer programs include computer-executable instructions that, when executed by the one or more processors, further cause the electronic apparatus to, based on the first display panel and the second display panel being implemented as liquid crystal display (LCD) panels:

based on operating in a three-dimensional image display mode, control the first display panel to displayed the multi-view image, and control the second display panel to display the two-dimensional image, and based on operating in a two-dimensional image display mode, control the first display panel to display a monochrome image in a predetermined color, and control the second display panel to display a two-dimensional image.

6. The electronic apparatus of claim 1, wherein the one or more computer programs include computer-executable instructions that, when executed by the one or more processors, further cause the electronic apparatus to, based on the second display panel being implemented as a self-luminous display panel:

based on operating in a three-dimensional image display mode, control the first display panel to display the multi-view image, and control the second display panel to display the two-dimensional image, and based on operating in a two-dimensional image display mode, turn off the first display panel, and control the second display panel to display a two-dimensional image.

7. The electronic apparatus of claim 1, further comprising:

a polarization control unit arranged between the first display and the second display.

8. The electronic apparatus of claim 1, wherein the micro-lens array comprises a lenticular lens.

9. A method for controlling an electronic apparatus, wherein the electronic apparatus comprises:

a first display comprising a first display panel for displaying a multi-view image and a micro-lens array which is arranged on a front surface of the first display panel and is for adjusting directions of lights output through the first display panel, a second display comprising a second display panel which is arranged on the front surface of the first display and displays a two-dimensional image corresponding to the multi-view image and has a transmittance greater than or equal to a predetermined value, and an illumination sensor, and wherein the method comprises:

acquiring, by the electronic apparatus, a user instruction for operating in a three-dimensional image display mode;

displaying, by the electronic apparatus, a multi-view image by using the first display panel in response to the user instruction;

displaying, by the electronic apparatus, a two-dimensional image by using the second display panel;

detecting, by the electronic apparatus, a light external to the electronic apparatus by using the illumination sensor;

determining, by the electronic apparatus, a strength of the light and a direction of the light;

identifying, by the electronic apparatus, an object included in the two-dimensional image; and processing, by the electronic apparatus, the multi-view image to include a shadow of the object based on location information of the object, shape information of the object, the strength of the light, and the direction of the light.

10. The method of claim 9, further comprising:

based on the multi-view image being displayed through the first display panel and the two-dimensional image being displayed through the second display panel, processing an area corresponding to the object in the multi-view image based on information on the object included in the two-dimensional image.

11. The method of claim 10, wherein the processing of the area comprises, based on the second display panel being implemented as a self-luminous display panel, and a pixel resolution of the first display panel being smaller than the pixel resolution of the second display panel:

processing the area corresponding to the object in the multi-view image in a predetermined color based on color information of the object included in the two-dimensional image.

12. The method of claim 11, wherein the area corresponding to the object included in the multi-view image is greater than an area wherein the object included in the two-dimensional image is displayed, and wherein the processing of the area comprises:

generating the two-dimensional image by processing remaining area excluding the area wherein the object is displayed in the area corresponding to the object in the two-dimensional image in a color corresponding to the multi-view image.

13. The method of claim 9, further comprising, based on the first display panel and the second display panel being implemented as liquid crystal display (LCD) panels:

acquiring a user instruction for operating in a two-dimensional image display mode; and based on operating in the two-dimensional image display mode, displaying a monochrome image in a predetermined color by using the first display panel, and displaying a two-dimensional image by using the second display panel.

14. The method of claim 9, further comprising:

based on operating in a three-dimensional image display mode, controlling the first display panel to display the multi-view image, and controlling the second display panel to display the two-dimensional image; and based on operating in a two-dimensional image display mode, turning off the first display panel, and controlling the second display panel to display a two-dimensional image.

15. The method of claim 9, further comprising:

arranging a polarization control unit between the first display and the second display.

16. The method of claim 9, wherein the micro-lens array comprises a lenticular lens.

17. One or more non-transitory computer-readable storage media storing computer-executable instructions that, when executed by one or more processors of an electronic apparatus, cause the electronic apparatus to perform operations, the operations comprising:

acquiring, by the electronic apparatus, a user instruction for operating in a three-dimensional image display mode;

displaying, by the electronic apparatus, a multi-view image by using a first display panel in response to the user instruction;

displaying, by the electronic apparatus, a two-dimensional image by using a second display panel;

detecting, by the electronic apparatus, a light external to the electronic apparatus by using an illumination sensor of the electronic apparatus;

determining, by the electronic apparatus, a strength of the light and a direction of the light;

identifying, by the electronic apparatus, an object included in the two-dimensional image; and processing, by the electronic apparatus, the multi-view image to include a shadow of the object based on location information of the object, shape information of the object, the strength of the light, and the direction of the light.

18. The one or more non-transitory computer-readable storage media of claim 17, the operations further comprising:

based on the multi-view image being displayed through the first display panel and the two-dimensional image being displayed through the second display panel, processing an area corresponding to the object in the multi-view image based on information on the object included in the two-dimensional image.

19. The electronic apparatus of claim 1, wherein the one or more computer programs include computer-executable instructions that, when executed by the one or more processors, further cause the electronic apparatus to:

based on the strength of the light being greater than a predetermined strength, adjust a brightness of the shadow of the object in the multi-view image to be brighter, based on the strength of the light being less than the predetermined strength, adjust the brightness of the shadow of the object in the multi-view image to be darker, and adjust a location of the shadow of the object in the multi-view image according to the direction of the light.

20. The method of claim 9, further comprising:

based on the strength of the light being greater than a predetermined strength, adjusting a brightness of the shadow of the object in the multi-view image to be brighter;

based on the strength of the light being less than the predetermined strength, adjusting the brightness of the shadow of the object in the multi-view image to be darker; and adjusting a location of the shadow of the object in the multi-view image according to the direction of the light.

* * * * *